United States Patent [19]
Huang

[11] Patent Number: 5,504,662
[45] Date of Patent: Apr. 2, 1996

[54] SAFETY BICYCLE SADDLE FLASHING LIGHT DEVICE

[76] Inventor: Wen-Chen Huang, No. 18, Alley 88, Lane 59, Nan Men Road, Taichung, Taiwan

[21] Appl. No.: 334,583

[22] Filed: Nov. 4, 1994

[51] Int. Cl.⁶ ........................................ B62J 6/04
[52] U.S. Cl. .............. 362/72; 362/75; 362/276; 362/802; 340/432; 200/61.12
[58] Field of Search ........................ 340/432, 479; 200/61.12; 362/72, 75, 276, 802, 157, 190, 191

[56] References Cited

U.S. PATENT DOCUMENTS

| | | | |
|---|---|---|---|
| D. 125,923 | 3/1941 | Mueller | 340/432 |
| 2,359,254 | 4/1943 | Silver | 200/85 |
| 4,031,343 | 6/1977 | Sopko | 200/61.12 |
| 4,093,263 | 6/1978 | Rihm | 280/289 |
| 4,833,444 | 5/1989 | Wisniewski | 340/432 |
| 4,896,138 | 1/1990 | Nickols | 340/479 |
| 4,949,228 | 8/1990 | Lin et al. | 362/72 |
| 4,967,179 | 10/1990 | Solini | 340/432 |

*Primary Examiner*—Denise L. Gromada
*Assistant Examiner*—Alan B. Cariaso
*Attorney, Agent, or Firm*—Fish & Richardson

[57] ABSTRACT

A safety bicycle saddle flashing light device including: a saddle mounted on the seat pillar of a bicycle, which saddle having a protective outer covering, a rigid inside covering disposed inside the protective outer covering, a foamed lining fastened to the protective outer covering on the inside and disposed between the protective outer covering and the rigid inside covering, and flash light disposed at a rear side outside the saddle; a control switch disposed inside the saddle, which control switch will be triggered to drive the flash light, when a person sits on said saddle, causing the flash light to flash at a low frequency; a DC power supply unit electrically connected to the flash light through the control switch; and a quick-flash starter mounted on the rear brake system of the bicycle and controlled to drive the flash light, when the rear brake cable of the rear brake of the bicycle is pulled up, causing it to flash at a high frequency.

6 Claims, 5 Drawing Sheets

SAFETY BICYCLE SADDLE FLASHING LIGHT DEVICE

BACKGROUND OF THE INVENTION

The present invention relates to bicycle saddles, and more particularly relates to safety bicycle saddle flashing light device which flashes at a low frequency when the rider sits on the saddle, and which flashes at a high frequency when the rear brake of the bicycle is operated.

Riding a bicycle in the dark is dangerous. In order to give a warning signal to the vehicles from behind, a rear light is commonly used. However, when a rear light is installed in a bicycle, a battery power supply must be used to provide the necessary power supply. Furthermore, the rear light of a bicycle must be manually controlled. Frequently switching on and off the rear light will cause the circuit damaged easily.

U.S. Pat. No. 4,093,263 discloses a safety bicycle seat reflector for use in bicycles. However, this safety bicycle seat reflector is still not satisfactory in function because it does not produce light itself.

SUMMARY OF THE INVENTION

The present invention has been accomplished under the aforesaid circumstances. It is therefore an object of the present invention to provide a safety bicycle saddle flashing light device which automatically gives a visual flash signal when the rider sits thereon. It is another object of the present invention to provide a safety bicycle saddle which automatically drives a flashing light to flash at a high frequency when the rear brake cable of the bicycle is pulled up.

According to one aspect of the present, the safety bicycle saddle flashing light device comprises a saddle mounted on the seat pillar of a bicycle, which saddle having a protective outer covering, a rigid inside covering disposed inside the protective outer covering, a foamed lining fastened to the protective outer covering on the inside and disposed between the protective outer covering and the rigid inside covering, and flash light disposed at a rear side outside the saddle; a control switch disposed inside the saddle, which control switch will be triggered to drive the flash light, when a person sits on said saddle, causing the flash light to flash at a low frequency; a DC power supply unit electrically connected to the flash light through the control switch; and a quick-flash starter mounted on the rear brake system of the bicycle and controlled to drive the flash light, when the rear brake cable of the rear brake of the bicycle is pulled up, causing it to flash at a high frequency.

According to another aspect of the present invention, the quick-flash starter comprises a first angle plate mounted on the sleeve of the rear brake cable of the rear brake system of the bicycle, a push-button type quick-flash control switch mounted on the first angle plate, a second angle plate mounted on the rear brake cable of the rear brake system of the bicycle, a presser rod mounted on the second angle plate and facing the push-button of the push-button type quick-flash control switch, wherein the presser rod is forced against the push-button of the push-button type quick-flash control switch, when the rear brake cable is pulled up, causing the flashing light driven by the push-button type quick-flash control switch to flash at a high frequency.

According to still another aspect of the present invention, second angle plate has a first round hole fastened to the rear brake cable by a tube and a screw, and a second round hole, which receives the presser rod, wherein the screw is threaded into the first round hole on the second angle plate and a screw hole on the tube to fix the second angle plate and the tube to the rear brake cable.

According to still another aspect of the present invention, the presser rod is connected to the second angle plate and moved in the second round hole of the second angle plate, having a front end mounted with a coil spring and screwed up with a nut and facing the push-button of the push-button type quick-flash control switch, which coil spring is stopped between the second angle plate and the nut to buffer the pressure being give by the presser rod to the push-button of the push-button type quick-flash control switch.

According to a yet further aspect of the present invention, the tube has a curved split extended through two opposite ends thereof, therefore the tube can be conveniently mounted around the rear brake cable through the curved split.

DETAILED DESCRIPTION OF THE PREFERRED EMBODIMENT

Figure 1:
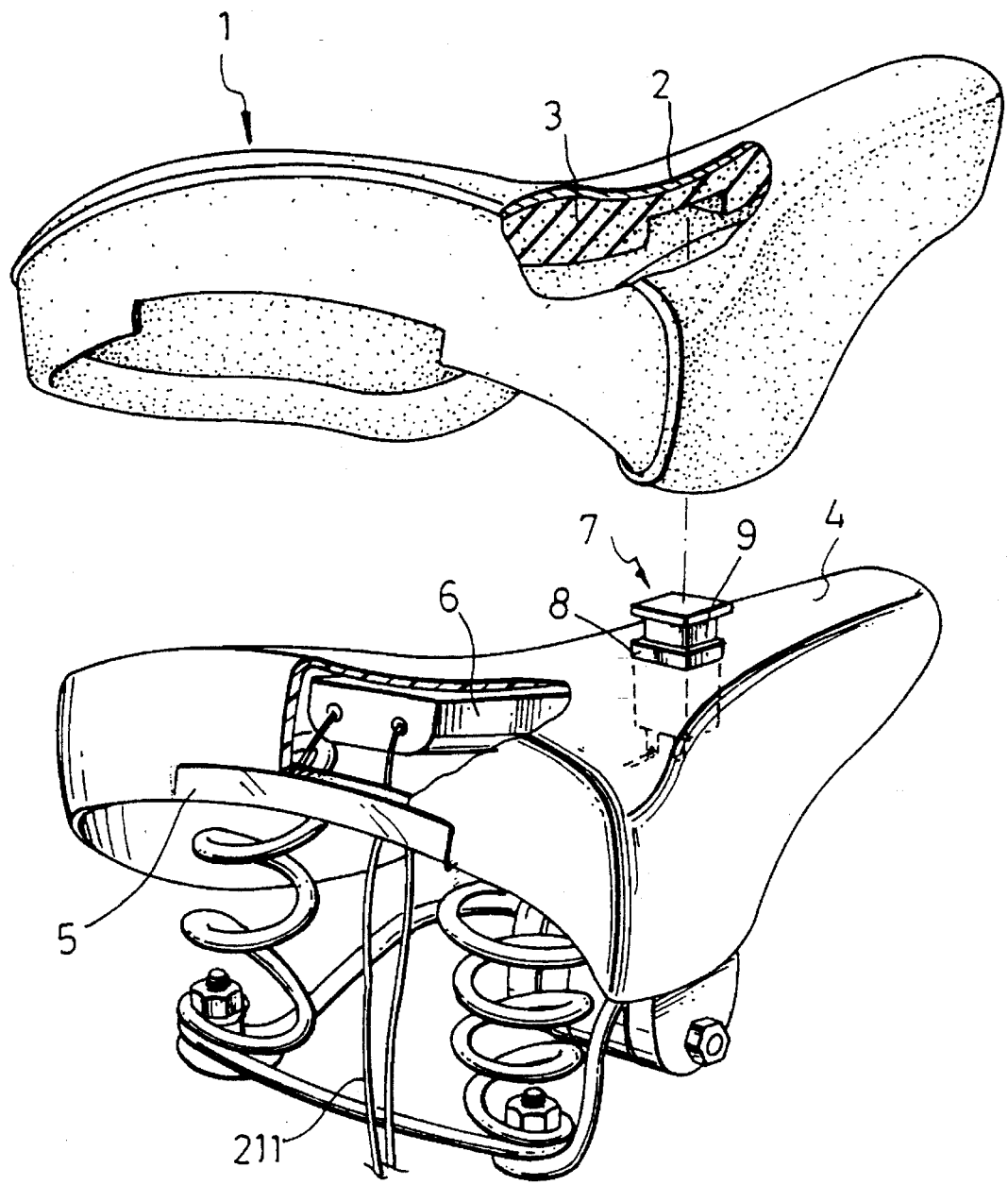
FIG. 1 is a cutaway and partially exploded view of a safety bicycle saddle flashing light device according to the present invention.
Figure 2:
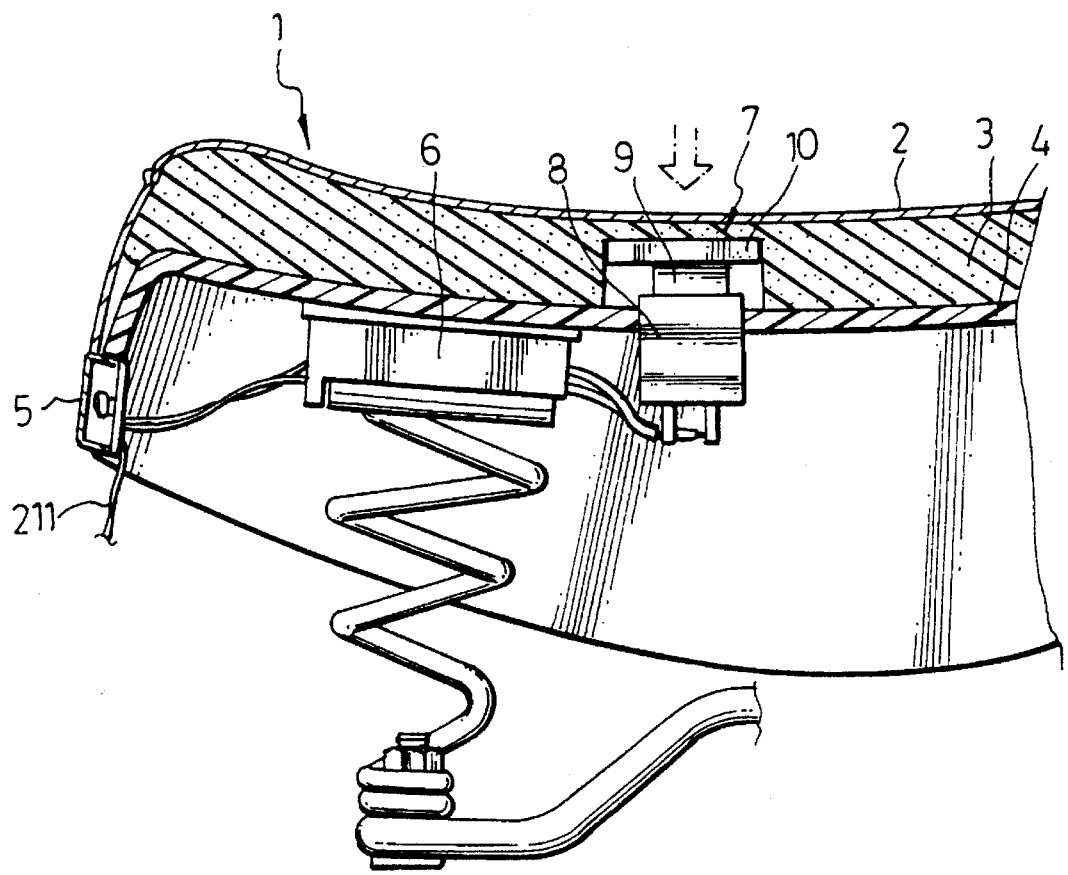
FIG. 2 is a sectional view of the safety bicycle saddle flashing light device shown in FIG. 1, showing the control switch depressed.
Figure 3:
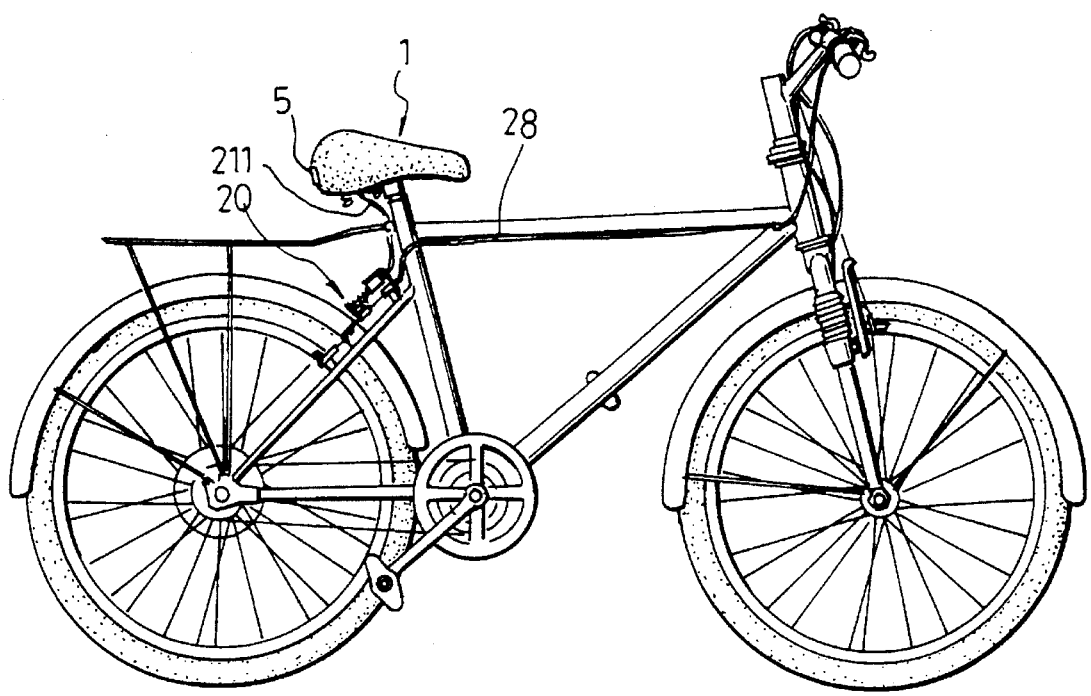
FIG. 3 is an installed view showing the present invention installed in a bicycle.

Referring to FIGS. 1, 2, and 3, a safety bicycle flashing light device, referenced by 1, comprises a protective outer covering 2, a rigid inside covering 4 disposed inside the protective outer covering 2, a foamed lining 3 fastened to the protective outer covering 2 on the inside and disposed between the protective outer covering 2 and the rigid inside covering 4, a flash light 5 fastened to the back side of the rigid inside covering 4 and extended out of the protective outer covering 2, a battery box 6 disposed within the rigid inside covering 4, and a control switch 7 disposed inside the safety bicycle saddle 1. When the rider sits on the saddle 1, the control switch 7 is depressed by the body weight of the rider, causing the flash light 5 to flash at a low frequency. The safety bicycle saddle 1 further comprises a quick-flash starter 20 installed in the rear brake of the bicycle (see FIGS. 4 and 5) and electrically connected to the flash light 5. When the quick-flash starter 20 is triggered, the flash light 5 is driven to flash at a high frequency.

Referring to FIG. 2, the control switch 7 is comprised of a switch body 8 mounted within a hole (not shown) on the rigid inside covering 4, a push-button type switching lever 9 received within the switch body 8 and disposed inside the foamed lining 3, wherein the push-button type switch lever 9 has a flat head 10 horizontally disposed at the top. The flat head 10 increases the bearing surface of the switching lever 9 so that the switching lever 9 can be easily switched on by the body weight of the rider as the rider sits on the saddle 1. The control switch 7 is switched on as the flat head 10 bears the pressure; the switching lever 9 automatically trips off when the pressure is released.

Figure 4:
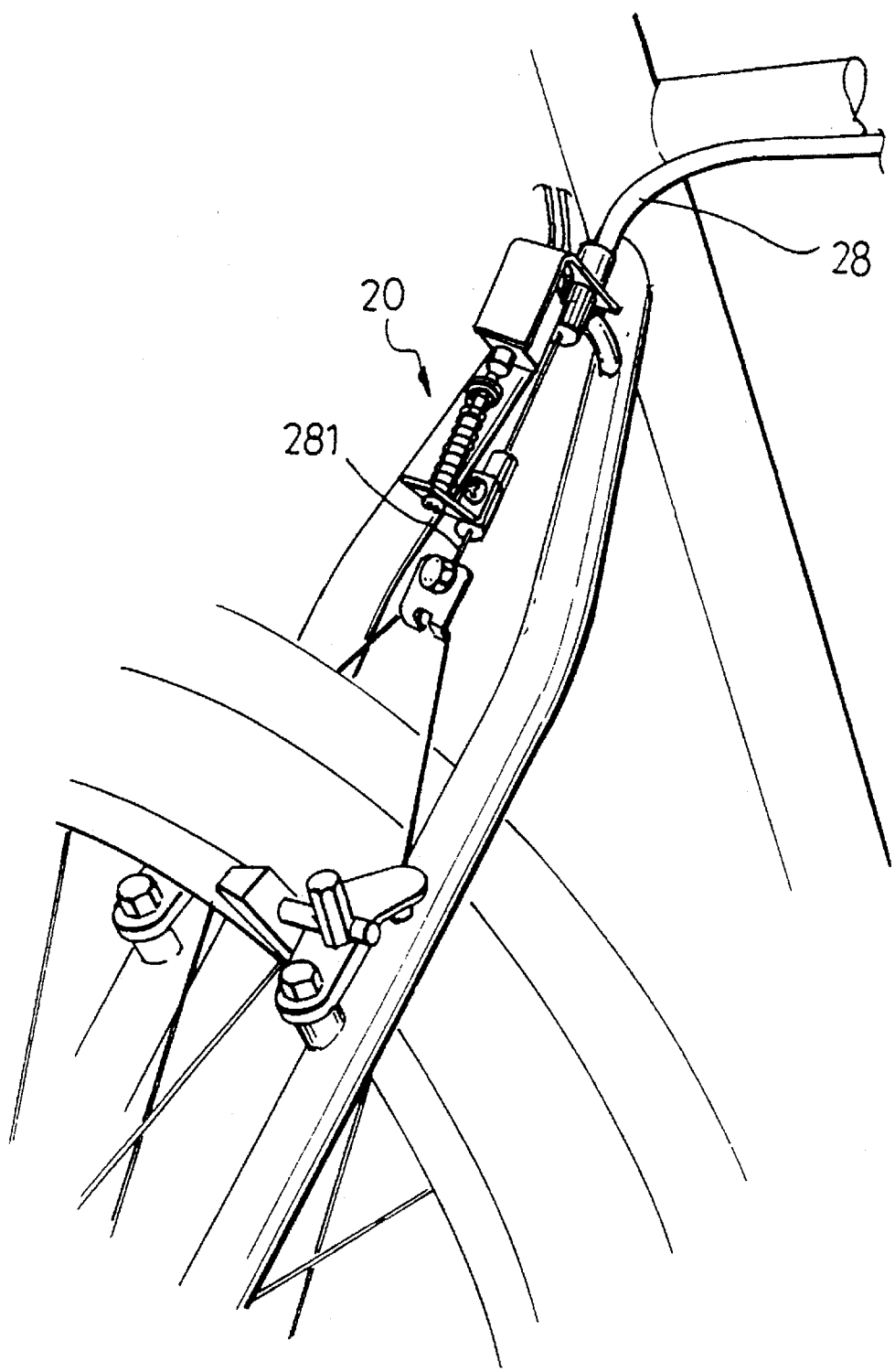
FIG. 4 is partial view in an enlarged scale of FIG. 3, showing the positioning of the quick-flash starter in the rear brake of the bicycle.
Figure 5:
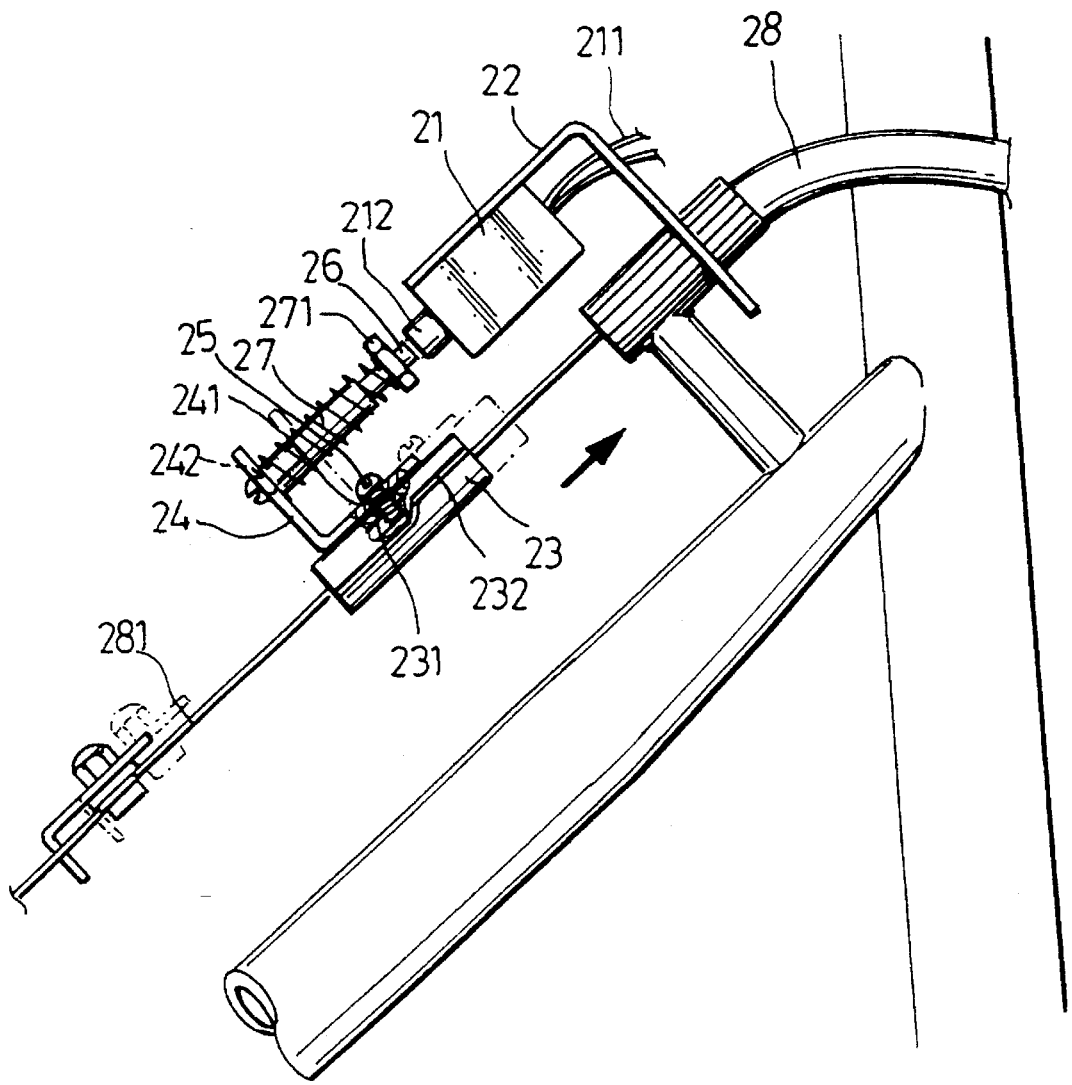
FIG. 5 shows the quick-flash starter of FIG. 4 triggered.

Referring to FIGS. 4 and 5, the quick-flash starter 20 comprises a quick-flash control switch 21 and a presser rod 26. The quick-flash control switch 21 is connected to the flash light 5 by an electric wire 211, having a button 212. When the button 212 is depressed, the flash light 5 is driven to flash at a high frequency. The quick-flash control switch 21 is mounted on a first angle plate 22, which is mounted around the rear brake cable sleeve 28. The presser rod 26 is inserted through a second round hole 242 on a second angle plate 24 and disposed in contact with or near to the button 212 of the quick-flash control switch 21. The second angle plate 24 has a first round hole 241. A tube 23 is mounted around the rear brake cable 281, having a screw hole 231. A screw 25 is inserted through the first round hole 241 on the second angle plate 24 and threaded into a screw hole 231 on a tube 23 to hold down the tube 23 and to fix the second angle plate 24 to the tube 23. The presser rod 26 is threaded with a nut 271. A coil spring 27 is mounted around the presser rod 26 and stopped between the nut 271 and the second angle plate 24. The diameter of the second round hole 242 is bigger than the outer diameter of the presser rod 26 but smaller that the inner diameter of the coil spring 27. When the rear brake is driven to pull up the rear brake cable 281, the second angle plate 24 is moved to force the presser rod 26 against the button 212 and to compress the coil spring 27 against the nut 271, and therefore the quick-flash control switch 21 is switched on, causing the flash light 5 to flash at a high frequency. If the second angle plate 24 is continuously moved forwards toward the quick-flash control switch 21 when the button 212 is completely depressed by the presser rod 26, the coil spring 27 is continuously compressed, and therefore no excessive pressure will be given to the button 212 of the quick-flash control switch 21. The tube 23 has a curved split 232 through the length. Through the curved split 232, the tube 23 can be mounted around the rear brake cable 281.

As indicated, the present invention provides a safety bicycle saddle which automatically gives a flash signal when the rider rides the bicycle, and automatically gives a higher frequency flash signal when the rear brake of the bicycle is operated, to warn the vehicles coming from behind.

While only one embodiment of the present invention have been shown and described, it will be understood that various modifications and changes could be made without departing from the spirit and scope of the invention.

What is claimed is:

1. A safety bicycle saddle flashing light device comprising:
    a saddle mounted on the seat pillar of a bicycle, said saddle comprising a protective outer covering, a rigid inside covering disposed inside said protective outer covering, a foamed lining fastened to said protective outer covering on the inside and disposed between said protective outer covering and said rigid inside covering, and a flash light disposed at a rear side outside said saddle;
    a control switch disposed inside said saddle, said control switch being triggered to drive said flash light, when a person sits on said saddle, causing said flash light to flash at a low frequency;
    a DC power supply unit electrically connected to said flash light through said control switch; and
    a quick-flash starter mounted on the rear brake system of the bicycle and controlled to drive said flash light, when the rear brake cable of the rear brake of the bicycle is pulled up, causing said flash light to flash at a high frequency.

2. The safety bicycle saddle flashing light device of claim 1 wherein said quick-flash starter comprises a first angle plate mounted on the sleeve of the rear brake cable of the rear brake system of the bicycle, a push-button type quick-flash control switch mounted on said first angle plate, a second angle plate mounted on the rear brake cable of the rear brake system of the bicycle, a presser rod mounted on said second angle plate and facing the push-button of said push-button type quick-flash control switch, said presser rod being forced against the push-button of said push-button type quick-flash control switch, when the rear brake cable is pulled up, causing said push-button type quick-flash control switch triggered.

3. The safety bicycle saddle flashing light device of claim 2 wherein said second angle plate has a first round hole fastened to the rear brake cable by a tube and a screw, and a second round hole, which receives said presser rod, said screw being threaded into said first round hole on said second angle plate and a screw hole on said tube to fix said second angle plate and said tube to the rear brake cable.

4. The safety bicycle saddle flashing light device of claim 2 wherein said presser rod is connected to said second angle plate and moved in said second round hole of said second angle plate, having a front end screwed up with a nut and facing said push-button of said push-button type quick-flash control switch.

5. The safety bicycle saddle flashing light device of claim 4 wherein said presser rod is mounted with a coil spring, said coil spring being mounted around said presser rod and stopped between said second angle plate and said nut.

6. The safety bicycle saddle flashing light device of claim 3 wherein said tube has a curved split extended through two opposite ends thereof.

\* \* \* \* \*